United States Patent
Bashir et al.

(10) Patent No.: US 9,695,365 B2
(45) Date of Patent: Jul. 4, 2017

(54) PROCESS FOR THE PRODUCTION OF OLEFINS THROUGH FT BASED SYNTHESIS

(71) Applicant: SAUDI BASIC INDUSTRIES CORPORATION, Riyadh (SA)

(72) Inventors: Mubarik Ali Bashir, Riyadh (SA); Khalid Karim, Riyadh (SA); Ali Essa Alhammad, Riyadh (SA)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

(21) Appl. No.: 14/907,863

(22) PCT Filed: Jul. 28, 2014

(86) PCT No.: PCT/IB2014/002416
§ 371 (c)(1),
(2) Date: Jan. 27, 2016

(87) PCT Pub. No.: WO2015/015311
PCT Pub. Date: Feb. 5, 2015

(65) Prior Publication Data
US 2016/0186070 A1    Jun. 30, 2016

Related U.S. Application Data

(60) Provisional application No. 61/860,479, filed on Jul. 31, 2013.

(51) Int. Cl.
| | | |
|---|---|---|
| C10G 2/00 | (2006.01) | |
| C10K 3/02 | (2006.01) | |
| C01B 3/36 | (2006.01) | |
| C10K 3/06 | (2006.01) | |
| C01B 3/34 | (2006.01) | |
| C10G 31/06 | (2006.01) | |

(52) U.S. Cl.
CPC ........... C10G 2/332 (2013.01); C01B 3/34 (2013.01); C01B 3/36 (2013.01); C10G 2/34 (2013.01); C10G 31/06 (2013.01); C10K 3/026 (2013.01); C10K 3/06 (2013.01); C01B 2203/0205 (2013.01); C01B 2203/025 (2013.01); C01B 2203/0216 (2013.01); C01B 2203/062 (2013.01); C01B 2203/1241 (2013.01); C01B 2203/148 (2013.01); C10G 2300/1025 (2013.01); C10G 2400/20 (2013.01); C10G 2400/22 (2013.01)

(58) Field of Classification Search
CPC .. C10K 3/026; C10K 3/06; C01B 2203/0205; C01B 2203/025; C01B 2203/062; C01B 2203/0148; C01B 2203/0216; C01B 2203/1241; C10G 31/06; C10G 2300/1025; C10G 2400/20; C10G 2400/22

See application file for complete search history.

(56) References Cited

U.S. PATENT DOCUMENTS

| | | |
|---|---|---|
| 2,568,953 A | 9/1951 | Dickinson et al. |
| 4,579,985 A | 4/1986 | Minderhoud et al. |
| 5,621,155 A | 4/1997 | Benham et al. |
| 5,714,657 A | 2/1998 | deVries |
| 6,114,400 A * | 9/2000 | Nataraj .............. C01B 3/36 252/373 |
| 6,787,576 B2 | 9/2004 | Kiss et al. |
| 6,846,404 B2 | 1/2005 | O'Rear |
| 6,872,753 B2 | 3/2005 | Landis et al. |
| 6,946,493 B2 | 9/2005 | Mohedas et al. |
| 7,067,560 B2 | 6/2006 | Bowe |
| 7,323,497 B2 | 1/2008 | Abbott et al. |
| 7,517,916 B2 | 4/2009 | Dierickx |
| 7,670,586 B2 | 3/2010 | Wang et al. |
| 7,829,602 B2 | 11/2010 | Litt et al. |
| 7,879,919 B2 | 2/2011 | Ernst et al. |
| 8,354,456 B2 | 1/2013 | Yagi et al. |
| 2004/0127758 A1 | 7/2004 | Van Edmond |
| 2005/0209347 A1 | 9/2005 | Bowe |
| 2007/0010590 A1 | 1/2007 | Abbott et al. |
| 2007/0069197 A1 | 3/2007 | Leclerc |
| 2007/0129450 A1 | 6/2007 | Barnicki et al. |
| 2007/0137107 A1 | 6/2007 | Barnicki |

(Continued)

FOREIGN PATENT DOCUMENTS

| | | |
|---|---|---|
| CN | 1137058 A | 12/1996 |
| CN | 1880414 A | 12/2006 |

(Continued)

OTHER PUBLICATIONS

International Search Report and Written Opinion issued on Feb. 24, 2015 for international application PCT/IB2014/002416, filed on Jul. 28, 2014 and published as WO 2015/015311 on Feb. 5, 2015 (Applicant—Saudi Basic Industries Corporation // Inventor—Bashir, et al.) (13 pages).

Janardanaro, "Direct Catalytic Conversion of Synthesis Gas to Lower Olefins", Ind. Eng. Chem. Res. (1990) vol. 29, pp. 1735-1753.

International Search Report and Written Opinion issued on Feb. 24, 2015 for international application PCT/IB2014/002359, filed on Jul. 28, 2014 and published as WO2015/015309 on Feb. 5, 2015 (Applicant—Saudi Basic Industries Corporation ll Inventor—Bashir, et al.) (10 pages).

International Search Report and Written Opinion issued on Feb. 24, 2015 for international application PCT/IB2014/002425, filed on Jul. 28, 2014 and published as WO 2015/015312 on Feb. 5, 2015 (Applicant—Saudi Basic Industries Corporation ll Inventor—Bashir, et al.) (12 pages).

Primary Examiner — Jafar Parsa
(74) Attorney, Agent, or Firm — Ballard Spahr LLP

(57) ABSTRACT

The present disclosures and inventions relate to a method comprising: a) introducing a natural gas; b) reforming the natural gas; wherein the reforming step comprises contacting the natural gas with steam to produce a syngas; c) converting the syngas to a product mixture comprising at least one olefin and a byproduct comprising a paraffin and a gasoline; wherein the converting step comprises contacting the syngas with a Co/Mn catalyst; and d) converting the byproduct to syngas.

15 Claims, 1 Drawing Sheet

(56) References Cited

U.S. PATENT DOCUMENTS

| | | |
|---|---|---|
| 2008/0132589 A1 | 6/2008 | Reynhout |
| 2008/0312347 A1* | 12/2008 | Ernst .......................... C01B 3/36 |
| | | 518/702 |
| 2010/0190874 A1 | 7/2010 | Mamedov et al. |
| 2011/0003900 A1 | 1/2011 | Yagi et al. |
| 2011/0118365 A1* | 5/2011 | Steiner ................... C07C 1/044 |
| | | 518/704 |
| 2012/0000883 A1 | 1/2012 | Adi |
| 2013/0210941 A1* | 8/2013 | Verhaak ............... B01J 23/8892 |
| | | 518/713 |

FOREIGN PATENT DOCUMENTS

| | | |
|---|---|---|
| CN | 101265149 A | 9/2008 |
| CN | 101307248 A | 11/2008 |
| EP | 0989093 A2 | 3/2000 |
| EP | 1625190 A1 | 2/2006 |
| EP | 2447339 A1 | 5/2012 |
| GB | 2494751 A | 3/2013 |
| WO | WO-03/048034 A1 | 6/2003 |
| WO | WO-2004/096952 A1 | 11/2004 |
| WO | WO-2006/039475 A2 | 4/2006 |
| WO | WO-2006/061552 A1 | 6/2006 |
| WO | WO-2007/069197 A2 | 6/2007 |
| WO | WO-2008/089376 A2 | 7/2008 |
| WO | WO-2012/000883 A1 | 1/2012 |

* cited by examiner

PROCESS FOR THE PRODUCTION OF OLEFINS THROUGH FT BASED SYNTHESIS

CROSS-REFERENCE TO RELATED APPLICATION

This is a U.S. National Phase Application of International Application No. PCT/IB2014/002416, filed Jul. 28, 2014, which claims the benefit of U.S. Provisional Application No. 61/860,479, filed on Jul. 31, 2013, which are both incorporated herein by reference in their entirety.

BACKGROUND

Syngas (mixtures of hydrogen and carbon monoxide), also called synthesis gas, can be readily produced from coal, methane (natural gas), or any carbonaceous feedstock by methods well known in the art and widely commercially practiced around the world. A number of well-known industrial processes use syngas for producing various oxygenated organic chemicals. The Fischer-Tropsch ("FT") catalytic process for catalytically producing hydrocarbons from syngas was initially discovered and developed in the 1920's, and was used in South Africa for many years to produce gasoline range hydrocarbons as automotive fuels. The catalysts typically comprised iron or cobalt supported on alumina or titania, and promoters, like rhenium, zirconium, manganese, and the like were sometimes used with cobalt catalysts, to improve various aspects of catalytic performance. The products were typically gasoline-range hydrocarbon liquids having six or more carbon atoms, along with heavier hydrocarbon products.

Accordingly, there remains a need for a method for producing an olefin from natural gas through reforming the natural gas to syngas and an apparatus for doing the same.

SUMMARY

In accordance with the purpose(s) of the invention, as embodied and broadly described herein, the invention, in one aspect, relates to methods comprising:
a) introducing a natural gas;
b) reforming the natural gas; wherein the reforming step comprises contacting the natural gas with steam to produce a syngas;
c) converting the syngas to a product mixture comprising at least one olefin and a byproduct comprising a paraffin and a gasoline; wherein the converting step comprises contacting the syngas with a Co/Mn catalyst; and
d) converting the byproduct to syngas.

Disclosed are apparatuses comprising:
a) a steam reformer, which is in fluid communication with the reactor; wherein the steam reformer reforms the natural gas to syngas;
b) a reactor, which is in fluid communication with a saturator; wherein the reactor converts the syngas to a product mixture comprising an olefin by contacting the syngas with a Co/Mn catalyst; and
c) a partial oxidation reactor, which is in fluid communication with the reactor; wherein the byproduct is converted to syngas.

In another aspect, disclosed is an apparatus comprising:
a) a steam reformer, which is in fluid communication with the reactor; wherein the steam reformer reforms the natural gas to syngas;
b) a reactor, which is in fluid communication with a saturator; wherein the reactor converts the syngas to a product mixture comprising an olefin by contacting the syngas with a Co/Mn catalyst;
c) a hydrogenator in fluid communication with the reactor; and
d) an adiabatic pre-reformer in fluid communication with the hydrogenator.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE FIGURES

The accompanying figure, which is incorporated in and constitutes a part of this specification, illustrates several aspects and together with the description serve to explain the principles of the invention.

Figure 1:
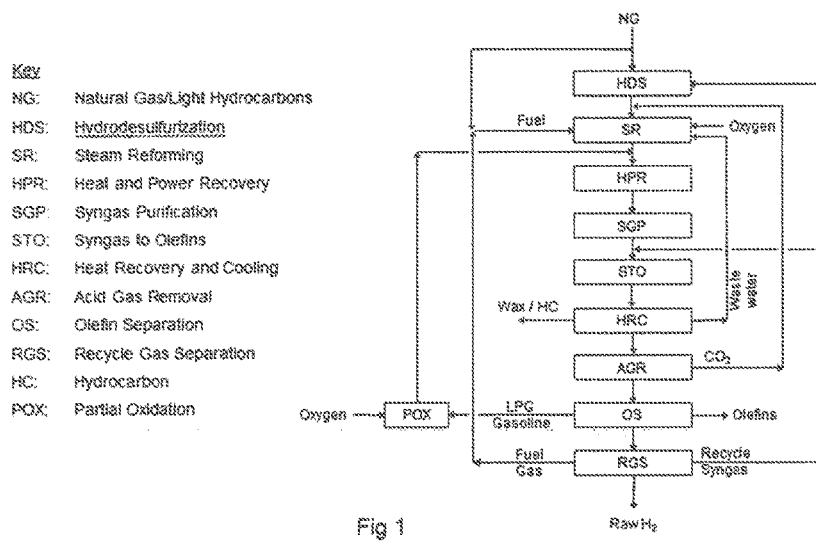
FIG. 1 shows a flow diagram of one example of a process and apparatus of the present invention directed to a partial oxidation step.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

A. Definitions

As used herein, nomenclature for compounds, including organic compounds, can be given using common names, IUPAC, IUBMB, or CAS recommendations for nomenclature. When one or more stereochemical features are present, Cahn-Ingold-Prelog rules for stereochemistry can be employed to designate stereochemical priority, E/Z specification, and the like. One of skill in the art can readily ascertain the structure of a compound if given a name, either by systemic reduction of the compound structure using naming conventions, or by commercially available software, such as CHEMDRAW™ (Cambridgesoft Corporation, U.S.A.).

As used in the specification and the appended claims, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

As used herein, the terms "optional" or "optionally" means that the subsequently described event or circumstance can or can not occur, and that the description includes instances where said event or circumstance occurs and instances where it does not.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc. It is also contemplated that, in certain aspects, unless expressly indicated to the contrary, individual substituents can be further optionally substituted (i.e., further substituted or unsubstituted).

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

B. Method

In one aspect, the method comprises:
a) introducing a natural gas;
b) reforming the natural gas; wherein the reforming step comprises contacting the natural gas with steam to produce a syngas;
c) converting the syngas to a product mixture comprising at least one olefin and a byproduct comprising a paraffin and a gasoline; wherein the converting step comprises contacting the syngas with a Co/Mn catalyst; and
d) converting the byproduct to syngas.

In one aspect, these steps are not limited to a specific order. In another aspect, these steps are limited to this order.

In one aspect, the method further comprises a step wherein waste water is produced prior to step d). In another aspect, the method further comprises a step comprising recovering the waste water; wherein some or all of the recovered waste water is added to the natural gas prior to being introduced.

The steam reforming in step b) can be based on any known reforming process, such as Steam Methane Reforming (SMR), Auto Thermal Reforming (ATR), or Partial Oxidation, Adiabatic Pre Reforming (APR), or Gas Heated Reforming (GHR), or any appropriate combination.

In a first aspect, in step d), the byproduct is converted into syngas by use of a partial oxidation reactor (POX) for syngas generation. The partially oxidized product is recycled back to the main process after the steam reformer and before the syngas to olefin reactor. In a second aspect, in step d), the byproduct is hydrogenated and then reformed in a pre-reformer. Hydrogenation can convert the one or more unsaturated hydrocarbons present in the byproduct to one or more paraffins. After hydrogenation, the one or more paraffins can be pre-reformed with steam where C2 and higher hydrocarbons are converted to syngas and methane. In one aspect, the one or more paraffins are not passed through a saturator. However, optionally, a saturator may be installed upstream of pre-reforming step. The pre- or partially reformed stream is then recycled to the main process steam reformer for further reforming for further conversion to syngas. These two aspects of converting the byproduct to syngas can increase the methane to olefin products conversion efficiency.

In one aspect, the method further comprises recovering carbon dioxide using an acid gas removal process. In another aspect, the method comprises recovering carbon dioxide formed during reforming the natural gas to syngas and/or after converting the syngas to a product mixture. In a further aspect, the carbon dioxide can be compressed and recycled back to the reforming the natural gas to syngas. Thus, in one aspect, the reforming step b) comprises contacting the natural gas with steam and recycled carbon dioxide. Carbon dioxide can be recycled back to the steam methane reformer in step b) as feed along with the natural gas feed. Carbon dioxide helps to increase the syngas (carbon monoxide) through a reverse water gas shift reaction in the steam methane reformer. This also helps utilize carbon dioxide and increase carbon efficiency.

In one aspect, in step c, the syngas is converted to the product mixture by contacting the syn gas with a Co/Mn catalyst. Syngas may be converted into hydrocarbons by a catalytic process which is usually referred to as the Fischer-Tropsch (FT) process. This is for example described by Van der Laan et at in Catal. Rev.-Sci. Eng., 41, 1999, p. 255. The product mixture can comprise at least one olefin, carbon dioxide, and hydrogen.

The product mixture, in addition to the at least one olefin, also typically comprises water, one or more alcohols, and one or more hydrocarbons. When the product mixture is cooled, water and one or more hydrocarbons can be condensed in the aqueous phase. The aqueous phase can comprise one or more hydrocarbons or one or more alcohols or a combination thereof. This aqueous phase can be called the waste water.

In one aspect, the olefin comprises C2-C10 hydrocarbons. In another aspect, the olefin comprises carbons ranging from two carbons to ten carbons, including 3, 4, 5, 6, 7, 8, or 9 carbons. In one aspect, the range of carbon atoms can be derived from any two preceding values. For example, the olefin can comprise carbons ranging from three carbons to nine carbons.

In one aspect, the olefin comprises at least one double bond. In another aspect, the olefin comprises two double bonds. In a further aspect, the olefin comprises three double bonds.

In one aspect, the olefin comprises ethylene, propene, 1-butene, 1-pentene, 1-heptene, 1-hexene, 2-ethyl-hexylene, 2-ethyl-heptene, 1-octene, 1-nonene, or 1-decene, or a combination thereof.

In one aspect, the olefin comprises multiple double bonds. In one aspect, the olefin can be a diolefin. In a further aspect, the olefin can be 1,3-butadiene, 1,4-pentadiene, heptadiene, or a combination thereof. In one aspect, the olefin can be a cyclic olefin and diolefin. In a further aspect, the olefin can be cyclopentene, cyclopentadiene, cyclohexene, cyclohexadiene, or methyl cyclopentadiene and the like; or a cyclic diolefindiene, e.g., dicyclopentadiene, methylcyclopentadiene dimer and the like.

In one aspect, the recovered waste water is used in the natural gas saturator, where natural gas is added to the water at a higher temperature. In one aspect, the natural gas is saturated with water. In one aspect, one or more hydrocarbons present in the recovered waste water can be stripped out of the natural gas stream. This process thereby can recover the waste water and eliminate, minimize, and/or reduce waste water treatment problems.

In one aspect, some or all of the recovered waste water is recycled as steam in step b). In another aspect, some or all of the recovered waste waster is recovered after step c). In one aspect, some or all of the recovered waste water is recycled after step c). In a further aspect, the waste water is produced from converting the syngas to the product mixture.

In one aspect, some of the recovered waste water comprises an alcohol or a hydrocarbon, or a combination thereof. In another aspect, the alcohol or hydrocarbon or a combination thereof is produced from converting the syngas to the product mixture. In a further aspect, the alcohol or the hydrocarbon, or the combination thereof is recycled to the reforming of the natural gas to syngas.

In another aspect, the alcohol can comprise a carbon chain with carbons ranging from two carbons to six carbons. In one aspect, the alcohol can comprise a straight or branched carbon chain. In another aspect, the alcohol can be a primary, secondary, or tertiary alcohol. In a further aspect, the alcohol can comprise ethanol, propanol, butanol, pentanol, hexanol, isopropanol, isobutanol, sec-butanol, or tert-butanol, or a combination thereof.

In a further aspect, the hydrocarbon can comprise a carbon chain with carbons ranging from two carbons to six carbons. In one aspect, the hydrocarbon can comprise a straight or branched carbon chain. In another aspect, the hydrocarbon can comprise ethane, propane, butane, pentane, hexane, or isobutane, or a combination thereof. In one aspect, the hydrocarbon can also called be a paraffin. In one aspect, the product mixture further comprises one or more hydrocarbons comprising carbons in an amount ranging from two carbons to five carbons. In one aspect, the hydrocarbon can be water soluble.

In one aspect, the gasoline can comprise any standard component of gasoline. In a further aspect, the gasoline can comprise hydrocarbons with between four to twelve carbon atoms. In another aspect, the hydrocarbon can be optionally substituted with other functional groups. In an even further aspect, the hydrocarbon can be branched carbon chain or a straight carbon chain. In a yet further aspect, the hydrocarbon chain can be cyclical.

In one aspect, the alcohol or the hydrocarbon, or a combination thereof is reformed in step b) with the natural gas to the syngas. In another aspect, the alcohol or the hydrocarbon, or a combination thereof can be economically recovered in this method.

In one aspect, the method further comprises purifying the product mixture by a cryogenic separation process.

In another aspect, the purifying the product mixture comprises separating methane, nitrogen, hydrogen, or carbon monoxide, or a combination thereof. In a further aspect, the method comprises recycling the methane or nitrogen, or a combination, thereof back to step b). In one aspect, the methane and nitrogen recycle stream can be used as fuel in step b). In a yet further aspect, the method comprises recycling the hydrogen, or carbon monoxide, or a combination thereof back to step c). This recycling back to step c) can help maintain the required hydrogen to carbon monoxide ratio.

In another aspect, the cryogenic separation process can comprise separating the methane and/or nitrogen. In a further aspect, the separated methane and/or nitrogen can be recycled to be used as fuel when the natural gas is reformed to syngas. In a yet further aspect, the hydrogen and/or carbon monoxide can be recycled to be combined with fresh syngas. In a yet further aspect, the excess hydrogen can be separated and used in an appropriate reforming process.

In one aspect, the method comprises recovering heat and/or power from step b). In another aspect, the heat can be recovered as high pressure steam. In a further aspect, the method comprises generating power as electricity. In an even further aspect, the electricity is generated by expanding the hot syngas.

In one aspect, the syngas comprises carbon monoxide, carbon dioxide, or hydrogen, or a combination thereof. In another aspect, the syngas comprises carbon monoxide and hydrogen.

In one aspect, the product mixture comprises one or more paraffins, one or more alcohols, water, or carbon dioxide, or a mixture thereof.

In a further aspect, the paraffin can comprise a light paraffin or a heavy paraffin, or a combination thereof. In one aspect, the heavy paraffin can comprise an alkane with more than five carbons. In another aspect, the light paraffin can comprise an alkane with one carbon to five carbons.

In one aspect, the conversion of syngas to a product mixture is in the range of from 40% to 90%, including exemplary values of 45%, 50%, 55%, 60%, 65%, 70%, 75%, 80%, and 85%. In a further aspect, the range can be derived from any two exemplary values. For example, the conversion of syngas to a product mixture can be in a range of from 45% to 90%.

In one aspect, the product mixture has a hydrocarbon selectivity in the range of from 50% to 90% including exemplary values of 55%, 60%, 65%, 70%, 75%, 80%, and 85%. In a further aspect, the range can be derived from any two exemplary values. For example, the product mixture has a hydrocarbon selectivity in the range of 55% to 90%.

The methods disclosed herein can be performed by the apparatus disclosed herein.

C. Apparatus

Also disclosed herein is an apparatus comprising:
a) a steam reformer, which is in fluid communication with a reactor; wherein the steam reformer reforms natural gas to syngas;
b) the reactor, which is in fluid communication with a saturator; wherein the reactor converts the syngas to a product mixture comprising at least one olefin by contacting the syngas with a Co/Mn catalyst; and
c) a partial oxidation reactor, which is in fluid communication with the reactor; wherein the byproduct is converted to syngas.

In another aspect, disclosed is an apparatus comprising:
a) a steam reformer, which is in fluid communication with a reactor; wherein the steam reformer reforms natural gas to syngas;
b) the reactor, which is in fluid communication with a saturator; wherein the reactor converts the syngas to a product mixture comprising an olefin by contacting the syngas with a Co/Mn catalyst;
c) a hydrogenator in fluid communication with the reactor; and
d) an adiabatic pre-reformer in fluid communication with the hydrogenator.

In one aspect, these apparatus units are not limited to a specific order. In another aspect, these apparatus units are limited to this order.

In one aspect, the apparatus further comprises a saturator, which is in fluid communication with the steam reformer; wherein the saturator recovers the waste water.

In one aspect, the apparatus further comprises an acid gas removal apparatus, which is in fluid communication with the reactor, wherein the acid gas removal apparatus recovers carbon dioxide.

In one aspect, the apparatus further comprises a cryogenic separation apparatus, which is in fluid communication with the reactor, wherein the cryogenic separation apparatus purifies one or more olefins.

In one aspect, the apparatus further comprises a heat and/or power recovery apparatus after the steam reformer.

In one aspect, the apparatus further comprises a hydrodesulfurization apparatus before the steam reformer.

In one aspect, FIG. 1 shows a flow diagram of one aspect of the method and the apparatus. In another aspect, not all the steps in the flow diagram are required for the inventive apparatus. In FIG. 1, the method starts with introducing the natural gas. The natural gas can flow to the hydrodesulfurization (HDS) to purify the natural gas. Carbon dioxide can be added between the hydrodesulfurization and the steam reforming. The purified natural gas can flow to the steam reforming (SR). Fuel in the form of recycled natural gas, and oxygen can also be added. The steam reforming can also use waste water from the heat recovery and cooling to produce steam. The steam reforming can reform the natural gas by contacting the natural gas with steam to produce a syngas. The syngas can flow to the heat and power recovery (HPR) where the heat and/or power can be recovered. The syngas can then flow to the syngas purification (SGP) where the syngas is purified. The purified syngas can then flow to the syngas to olefin (STO) where the olefin, paraffin or hydrocarbons or a combination thereof are formed. The olefin stream can then flow to the heat recovery and cooling (HRC) where the waste water is removed to be recycled back to the steam reforming. The olefin stream can also be purified by removing a paraffin or a hydrocarbon or a combination thereof. The purified olefin stream can flow to the acid gas removal (AGR) where the carbon dioxide can be removed and recycled to before the steam reforming. The purified olefin can flow to the olefin separation (OS) where the olefins are separated into various streams, including the gas stream. The gas stream can flow to the recycle gas separation (RGS) where the methane and nitrogen are removed to be recycled back to the SR as fuel. Unreacted hydrogen and carbon monoxide can be separated at the RGS and recycled back to the hydrodesulfurization to be combined with the syngas. Typically, only a very small quantity of this stream is recycled back to hydrodesulfurization to fulfill the requirement of hydrogen. The bulk of the recycle syngas is recycled to the STO as feed.

In one aspect, the byproduct takeoff stream from the OS comprising LPG and gasoline is converted into syngas by use of a partial oxidation reactor (POX). The partially oxidized product is recycled back to the main process after the SR and before the STO.

Figure 2:
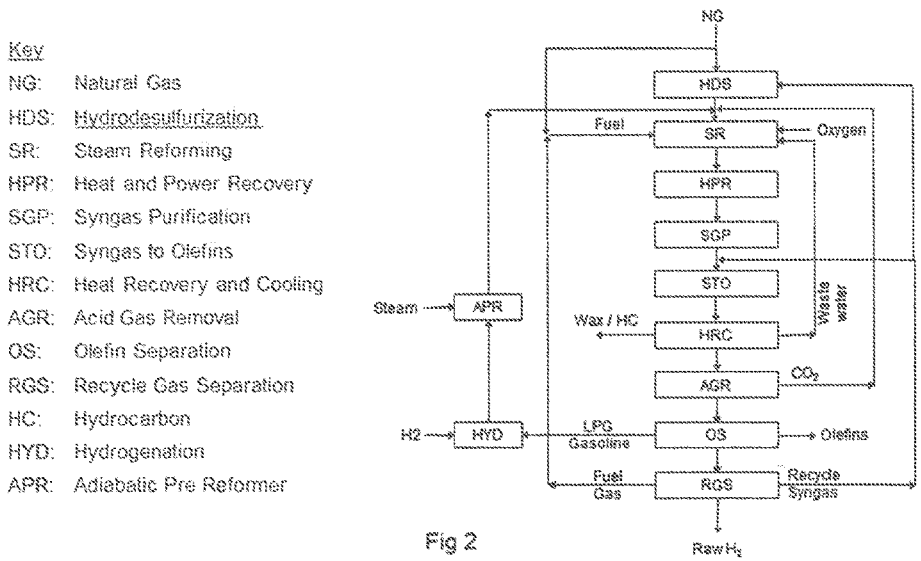
FIG. 2 shows a flow diagram of a second example of a process and apparatus of the present invention directed to a hydrogenation and adiabatic pre-reformer step.

In FIG. 2, another aspect of the byproduct to syngas conversion is shown. The byproduct is hydrogenated in the HYD and then reformed in a pre-reformer in the APR. Hydrogenation can convert unsaturated hydrocarbons present in the byproduct to one or more paraffins. After hydrogenation, the one or more paraffins can be pre-reformed with steam where C2 and higher hydrocarbons are converted to syngas and methane. In one aspect, the one or more paraffins can be not passed through a saturator. However, optionally, a saturator may be installed upstream of pre-reforming step. The pre- or partially reformed stream is then recycled to the main process SR for further reforming for further conversion to syngas.

In one aspect, in the hydrodesulfurization can comprise desulfurization in a conventional hydrodesulfurization apparatus. In one aspect, the process can be carried out in two catalytic steps. In another aspect, in the first step, an organic sulfur (for example mercaptans) can be converted to $H_2S$ through hydrogenation over a CoMo catalyst or a NiMo catalyst. In a further aspect, the hydrodesulfurization can require a small amount of hydrogen in the natural gas. In one aspect, in the second step, the $H_2S$ can be adsorbed onto a ZnO adsorbent. In a further aspect, the natural gas can comprise other impurities, such as chloride or mercury and can be removed by one or more additional steps. In an even further aspect, the hydrodesulfurization can be integrated with the steam reformer for any heat requirements.

In another aspect, the hydrodesulfurization can be carried out at a temperature ranging from 350° C. to 400° C. temperature, including exemplary values of 360° C., 370° C., 380° C., and 390° C. In a further aspect, the range can be derived from any two exemplary values. For example, the temperature can range from 360° C. to 400° C.

In one aspect, the hydrodesulfurization can be carried out at a pressure ranging from 30 to 50 bar, including exemplary values of 31 bar, 32 bar, 33 bar, 34 bar, 35 bar, 36 bar, 37 bar, 38 bar, 39 bar, 40 bar, 41 bar, 42 bar, 43 bar, 44 bar, 45 bar, 46 bar, 47 bar, 48 bar, and 49 bar. In a further aspect, the range can be derived from any two exemplary values. For example, the pressure can range from 31 bar to 50 bar.

In another aspect, the natural gas is reformed into syngas in the steam reforming. In a further aspect, the natural gas can be reformed either catalytically and/or non-catalytically. In an even further aspect, the natural gas can be reformed to syngas comprising carbon monoxide, carbon dioxide, and or hydrogen. In a yet further aspect, the reforming step uses steam, optionally in combination with oxygen, as an oxidant. The steam reforming can be in a single step or by combination of many reforming techniques. In another aspect, the reforming can use Steam Methane Reforming, Auto Thermal Reforming, Partial Oxidation, Adiabatic Pre Reforming, or Gas Heated Reforming. In one aspect, the syngas can be available at a pressure ranging from 30-50 bar and at a temperature ranging from 850° C. to 1300° C. In another aspect, the hot syngas flows to heat and power recovery.

In one aspect, in the heat and power recovery, a significant amount of heat can be recovered from high pressure steam generation. In another aspect, the heat and power recovery can generate a considerable amount of electricity by expanding the hot syngas through a hot gas expander coupled with an electricity generator. In a further aspect, the syngas flows from the heat and power recovery to the syngas purifier.

In one aspect, the syngas is purified at the syngas purifier. The syngas can be at a relatively low temperature and pressure. The syngas purifier can remove at least one nitrogenous impurity and/or at least one metal impurity. The nitrogenous impurity can comprise $NH_3$, HCN, or $NO_X$, or a combination thereof. The metal impurity can comprise iron carbonyl, or nickel carbonyl, or a combination thereof. These impurities can act as a poison for the CoMn catalyst used to convert syngas to the product mixture. The purified syngas can flow to where the syngas is converted to the product mixture.

In one aspect, the syngas is converted to the product mixture. In another aspect, the purified syngas and the recycled gas is converted to the product mixture. In a further aspect, the $H_2/CO$ ratio can be adjusted by the combination of the fresh and recycle syngas streams. In one aspect, other parameters also control the hydrogen/carbon monoxide ratio, for example the carbon dioxide recycle to the steam reformer. The combined syngas stream with required $H_2/CO$ ratio and purity can be converted to the product mixture using a CoMn catalyst.

In one aspect, the conversion is carried out at a temperature ranging from 200° C. to 300° C., including exemplary values of 210° C., 220° C., 230° C., 240° C., 250° C., 260° C., 270° C., 280° C., and 290° C. In a further aspect, the range can be derived from any two exemplary values. For example, the temperature can range from 210° C. to 300° C.

In one aspect, the conversion is carried out at a pressure ranging from 5 bar to 15 bar, including exemplary values of 6 bar, 7 bar, 8 bar, 9 bar, 10 bar, 11 bar, 12 bar, 13 bar, and 14 bar. In a further aspect, the range can be derived from any two exemplary values. For example, the pressure can range from 6 bar to 15 bar.

In one aspect, the reactor effluent from the conversion of the syngas to the product mixture can be at moderately high temperature and can be subjected to heat recovery by heating the reactor feed stream in a feed-effluent heat exchanger. This stream can be further cooled to room temperature in series of gradual cooling steps to facilitate separation of a small amount of one or more paraffins and one or more alcohols along with water, which were produced during the conversion to the product mixture.

In one aspect, the product mixture can then flow to the heat recovery and cooling where the waste water can be removed and recycled to the steam reformer. In another aspect, the product mixture can be purified by removing one or more paraffins or one or more hydrocarbons or a combination thereof.

In one aspect, after separating the one or more paraffins, one or more alcohols, and water, the gas stream is sent to the acid gas removal to remove the carbon dioxide. The carbon dioxide can be formed in the steam reformer and/or during the conversion to the product mixture. In one aspect, the acid gas removal can use a conventional unit. In a further aspect, the acid gas removal can use a Benfield unit. After the carbon dioxide has been removed, it can be compressed and recycled back to the steam reformer.

In one aspect, the product mixture flows to the olefin separation unit. In another aspect, the olefin separation unit separates an olefin, a light paraffin, or a heavy paraffin, or a combination thereof.

In one aspect, the product mixture flows to the recycle gas separation. In one aspect, the product mixture includes gases from the OS, such as CH4, N2, H2, and/or CO. At the recycle gas separation, the gas stream can be separated using a cryogenic separation unit. In one aspect, the cryogenic separation unit can be any suitable cryogenic separation unit. The gas stream can comprise methane, nitrogen, hydrogen, or carbon monoxide, or a combination thereof. In another aspect, the methane and nitrogen stream can be separated in the recycle gas separation to be used as a purge gas fuel in the steam reformer. In a further aspect, the unreacted hydrogen and carbon monoxide can be recycled back and combined with fresh syngas before sending the syngas to be converted to the product mixture. In an even further aspect, the excess hydrogen is also separated in the recycle gas separation. The excess hydrogen can be eliminated by adopting appropriate reforming technology.

The apparatuses disclosed herein can use the methods disclosed herein.

D. Aspects

The disclosed methods and apparatuses include at least the following aspects.

Aspect 1: A method comprising:
a) introducing a natural gas;
b) reforming the natural gas; wherein the reforming step comprises contacting the natural gas with steam to produce a syngas;
c) converting the syngas to a product mixture comprising at least one olefin and a byproduct comprising a paraffin and a gasoline; wherein the converting step comprises contacting the syngas with a Co/Mn catalyst; and
d) converting the byproduct to syngas.

Aspect 2: The method according to aspect 1, wherein the method produces waste water prior to step d).

Aspect 3: The method according to aspect 2, wherein the method recovers the waste water; wherein some or all of the recovered waste water is used to saturate the natural gas prior to being introduced.

Aspect 4: The method according to any one of aspects 1-3, wherein in step d), the converting the byproduct to syngas comprises partially oxidizing the byproduct and recycling the partially oxidized byproduct to after step b) and before step c).

Aspect 5: The method according to any one of aspects 1-4, wherein in step d), the converting the byproduct to syngas comprises hydrogenation and pre-reforming of the byproduct and recycling the hydrogenated and pre-reformed byproduct to before step b).

Aspect 6: The method according to any of aspects 1-5, wherein the method further comprises recovering carbon dioxide using an acid gas removal process.

Aspect 7: The method according to any of aspects 3-6, wherein some of the recovered waste water is recycled as steam in step b).

Aspect 8: The method according to any of aspects 3-7, wherein some of the recovered waste water comprises one or more alcohols or one or more hydrocarbons, or a combination thereof.

Aspect 9: The method according to aspect 8, wherein the one or more alcohols or the one or more hydrocarbons, or a combination thereof is reformed in step b) with the natural gas.

Aspect 10: The method according to any of aspects 1-9, wherein the method further comprises purifying the product mixture by a cryogenic separation process.

Aspect 11: The method according to aspect 10, wherein the purifying the product mixture comprises separating methane, nitrogen, hydrogen, or carbon monoxide, or a combination thereof.

Aspect 12: The method according to aspect 11, wherein the method comprises recycling the methane or nitrogen, or a combination thereof back to step b).

Aspect 13: The method according to any of aspects 1-12, wherein the method comprises recycling the hydrogen, or carbon monoxide, or a combination thereof back to step c).

Aspect 14: The method according to any of aspects 1-13, wherein the method comprises recovering heat and/or power from step b).

Aspect 15: The method according to any of aspects 1-14, wherein the syngas comprises carbon monoxide, carbon dioxide, or hydrogen, or a combination thereof.

Aspect 16: The method according to any of aspects 1-15, wherein the product mixture further comprises one or more paraffins, one or more alcohols, water, or carbon dioxide, or a mixture thereof.

Aspect 17: The method according to any of aspects 1-16, wherein the product mixture further comprises one or more hydrocarbons comprising carbons in an amount ranging from two carbons to five carbons.

Aspect 18: The method according to any of aspects 1-17, wherein the conversion of the syngas to a product mixture is in the range of from 40% to 90%.

Aspect 19: The method according to any of aspects 1-18, wherein the product mixture has a hydrocarbon selectivity in the range of from 50% to 90%.

Aspect 20: An apparatus comprising:
a) a steam reformer, which is in fluid communication with a reactor; wherein the steam reformer reforms natural gas to syngas;
b) the reactor, which is in fluid communication with a saturator; wherein the reactor converts the syngas to a product mixture comprising an olefin by contacting the syngas with a Co/Mn catalyst; and
c) a partial oxidation reactor, which is in fluid communication with the reactor; wherein the byproduct is converted to syngas.

Aspect 21: An apparatus comprising:
a) a steam reformer, which is in fluid communication with a reactor; wherein the steam reformer reforms natural gas to syngas;
b) the reactor, which is in fluid communication with a saturator; wherein the reactor converts the syngas to a product mixture comprising an olefin by contacting the syngas with a Co/Mn catalyst;
c) a hydrogenator in fluid communication with the reactor; and
d) an adiabatic pre-reformer in fluid communication with the hydrogenator.

Aspect 22: The apparatus according to any one of aspects 20-21, wherein the apparatus further comprises a saturator, which is in fluid communication with the steam reformer; wherein the saturator recovers the waste water.

Aspect 23: The apparatus according to any of aspects 20-22, wherein the apparatus further comprises an acid gas removal apparatus, which is in fluid communication with the reactor, wherein the acid gas removal apparatus recovers carbon dioxide.

Aspect 24: The apparatus according to any of aspects 20-23, wherein the apparatus further comprises a cryogenic separation apparatus, which is in fluid communication with the reactor, wherein the cryogenic separation apparatus purifies at least one olefin.

Aspect 25: The apparatus according to any of aspects 20-24, wherein the apparatus further comprises a heat and power recovery apparatus after the steam reformer.

Aspect 26: The apparatus according to any of aspects 20-25, wherein the apparatus further comprises a hydrodesulfurization apparatus before the steam reformer.

What is claimed is:

1. A method comprising:
a) introducing a natural gas;
b) reforming the natural gas; wherein the reforming step comprises contacting the natural gas with steam to produce a syngas;
c) converting the syngas to a product mixture comprising at least one olefin and a byproduct comprising a paraffin and a gasoline; wherein the converting step comprises contacting the syngas with a Co/Mn catalyst; and
d) converting the byproduct to syngas.

2. The method according to claim 1, wherein the method produces waste water prior to step d).

3. The method according to claim 2, wherein the method recovers the waste water; wherein some or all of the recovered waste water is used to saturate the natural gas prior to being introduced.

4. The method according to claim 1, wherein in step d), the converting the byproduct to syngas comprises partially oxidizing the byproduct and recycling the partially oxidized byproduct to after step b) and before step c).

5. The method according to claim 1, wherein in step d), the converting the byproduct to syngas comprises hydrogenation and pre-reforming of the byproduct and recycling the hydrogenated and pre-reformed byproduct to before step b).

6. The method according to claim 1, wherein the method further comprises recovering carbon dioxide using an acid gas removal process.

7. The method according to claim 3, wherein some of the recovered waste water is recycled as steam in step b).

8. The method according to claim 3, wherein some of the recovered waste water comprises one or more alcohols or one or more hydrocarbons, or a combination thereof.

9. The method according to claim 8, wherein the one or more alcohols or the one or more hydrocarbons, or a combination thereof is reformed in step b) with the natural gas.

10. The method according to claim 1, wherein the method further comprises purifying one or more olefins by a cryogenic separation process.

11. The method according to claim 10, wherein the purifying the olefin comprises removing methane, nitrogen, hydrogen, or carbon monoxide, or a combination thereof.

12. The method according to claim 11, wherein the method comprises recycling the methane or nitrogen, or a combination thereof back to step b).

13. The method according to claim 1, wherein the method comprises recycling the hydrogen, or carbon monoxide, or a combination thereof back to step c).

14. The method according to claim 1, wherein the method comprises recovering heat and/or power from step b).

15. A method comprising:
a) introducing a natural gas;
b) removing sulfur from the natural gas;
c) reforming the natural gas; wherein the reforming step comprises contacting the natural gas with steam to produce a syngas;
d) recovering heat and/or power from step c);
e) converting the syngas to a product mixture comprising at least one olefin and a byproduct comprising a paraffin and a gasoline; wherein the converting step comprises contacting the syngas with a Co/Mn catalyst;
f) recovering heat from step e);
g) recovering carbon dioxide in the product mixture using an acid gas removal process;
h) separating at least a portion of the at least one olefin and at least a portion of the byproduct from the product mixture;
i) converting the byproduct to syngas by partially oxidizing the byproduct and recycling the partially oxidized byproduct to after step c) and before step e); and
j) separating syngas from the product mixture after the at least a portion of the at least one olefin and a the t least a portion of the byproduct were separated from the product mixture.

* * * * *